Dec. 5, 1944.     J. L. JONES     2,364,449
AGRICULTURAL IMPLEMENT
Filed Oct. 18, 1943
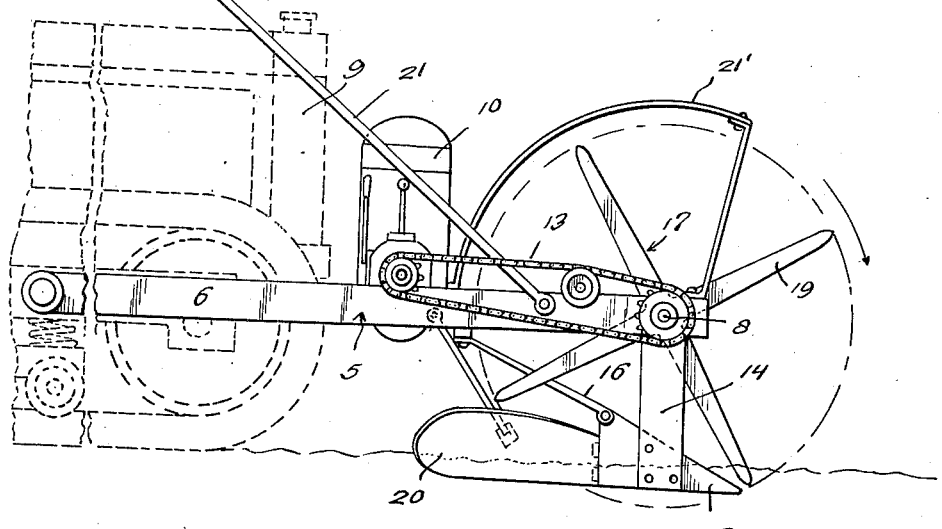
Fig. 1.
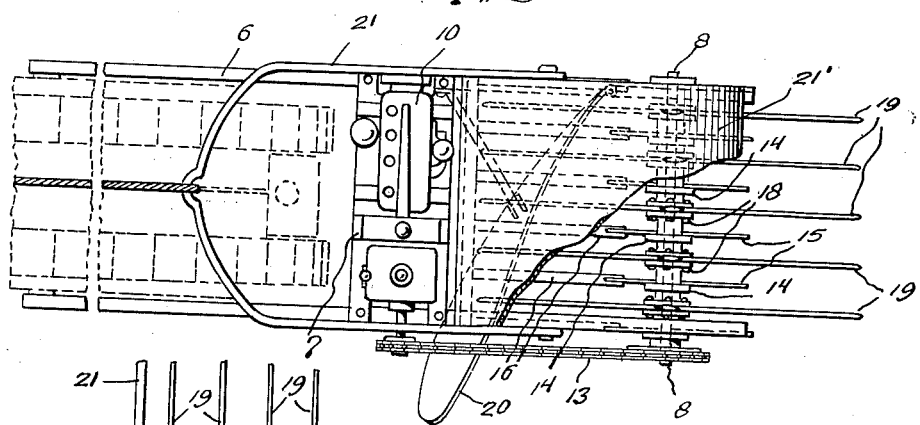
Fig. 2
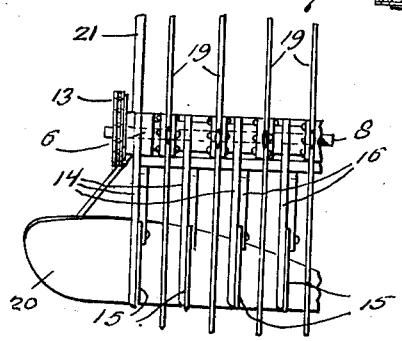
Fig. 3.   John L. Jones, Inventor
By McMorrow and Berman
Attorneys Patented Dec. 5, 1944

2,364,449

UNITED STATES PATENT OFFICE 2,364,449

AGRICULTURAL IMPLEMENT

John L. Jones, Fairview, W. Va.

Application October 18, 1943, Serial No. 506,729

4 Claims. (Cl. 97—35)

This invention relates to a power operated implement especially adapted for conditioning land for agricultural purposes which has been idle and growth has grown thereon. The primary object of the invention is the provision of a device of this character which may be readily adapted to a tractor and operated in advance thereof for working the soil and cutting the growth thereon, as well as digging the roots of said growth and also to turn the soil with the growth into furrows for the decomposing of the growth and thereby enrich the soil.

With these and other objects in view, as will become more apparent as the description proceeds, the invention consists in certain novel features of construction, combination and arrangement of parts as will be hereinafter more fully described and claimed.

For a complete understanding of my invention, reference is to be had to the following description and accompanying drawing, in which Figure 1 is a side elevation illustrating an agricultural implement constructed in accordance with my invention and showing the same applied to a fragmentary portion of a tractor.

Figure 2 is a top plan view illustrating the device applied to the tractor.

Figure 3 is a fragmentary front elevation illustrating the device.

Referring in detail to the drawing, the numeral 5 indicates a frame consisting primarily of side members, a platform 7 and a shaft 8 journaled in the side members forwardly of the platform. The side members besides being joined by the platform 7 extend rearwardly thereof and are mounted in the usual manner on a tractor 9 so that the platform and shaft 8 will be arranged at a selected distance in advance of the tractor. The platform 7 supports an engine or some other suitable type of prime mover 10 having a driving means 13 connecting the shaft 8 thereto.

Depending from the shaft 8 are spaced supporting members 14, the shaft 8 being free to rotate relative to the supporting members. Substantially triangular shaped ground or soil working blades 15 are secured to the members 14 with the apexes thereof disposed forwardly. Extending from the blades or ground working elements 15 are braces 16 secured to the frame 5. The blades 15 act in the ground or soil so as to thoroughly loosen the soil and especially the top soil and to remove or cut therefrom roots of growth growing in the soil.

It is preferable that the upper edges of the blades be sharpened.

A plurality of rotatable cutters 17 is secured on the shaft 8 for rotation therewith and are adapted to act on the soil in conjunction with the blades 15 to cut the roots from the soil and further to work the soil. Each rotary cutter includes a sectional hub 18 wherein the sections are bolted together and radially extending blades 19 provided with pointed free ends and each having opposite longitudinal edges thereof sharpened. The blades act to cut the growth above the surface of the soil and also the blades act within the top soil along with the blades 15 in cutting and digging the roots of the growth, so as to destroy the undesirable growth on the soil or land being treated by the device.

Secured to one of the end blades 15 and extending transversely and rearwardly of the remaining blades is a moldboard 20 which is adapted to form the cut growth and loosened soil into a furrow covering the cut growth with the soil so that it will readily decompose. The soil along with the growth being formed into a furrow permits the device to be used on hillsides for the purpose of forming terraces to pevent the soil from washing.

The side members of the frame have pivoted thereto a yoke 21 which may be connected in any suitable manner to a hoist mechanism of the tractor for the purpose of sustaining the frame at a desired height from the ground and thereby govern the depth of action of the blades 15 and 19 in the soil.

A guard 21' is arranged over a portion of the rotary cutters 17 and is suitably supported on the frame 5.

While I have shown and described the preferred embodiment of my invention, it will be understood that minor changes in construction, combination and arrangement of parts may be made without departing from the spirit and scope of the invention as claimed.

Having thus described the invention, what I claim is:

1. In an agricultural implement, a frame mountable and a tractor with a portion thereof arranged in advance of said tractor, a shaft journaled on said portion of the frame, rotary cutters secured to said shaft, power means carried by the frame for driving said cutters, a group of spaced parallel soil working elements carried by the frame and cooperating with the cutters in working the soil in cutting growth therefrom, and a mold board for furrowing the soil and growth acted on by said cutters and elements and secured to one of the end elements of the group and curving in the direction of and beyond the other end element.

2. In an agricultural implement, a frame including side members and a platform with said side members extending forwardly and rearwardly of the platform and having rear portions mounted on a tractor for pivotal movement, means for connecting the frame to a hoisting mechanism of the tractor for supporting the side members at a selected height from the ground, a shaft journaled on the forward portions of the side members, a power means connected to said shaft and mounted on the platform, rotary cutters secured to said shaft, ground engaging blades supported by said shaft and braced to said frame to act on the soil and cooperate with the cutters in severing growth.

3. In an agricultural implement, a frame including side members and a platform with said side members extending forwardly and rearwardly of the platform and having rear portions mounted on a tractor for pivotal movement, means for connecting the frame to a hoisting mechanism of the tractor for supporting the side members at a selected height from the ground, a shaft journaled on the forward portions of the side members, a power means connected to said shaft and mounted on the platform, rotary cutters secured to said shaft, ground engaging blades supported by said shaft and braced to said frame to act on the soil and cooperate with the cutters in severing growth, and a mold board secured to one of the blades and extending rearwardly and across the rear of the other blades.

4. In an agricultural implement, a frame including side members and a platform with said side members extending forwardly and rearwardly of the platform and having rear portions mounted on a tractor for pivotal movement, means for connecting the frame to a hoisting mechanism of the tractor for supporting the side members at a selected height from the ground, a shaft journaled on the forward portions of the side members, a power means connected to said shaft and mounted on the platform, rotary cutters secured to said shaft, ground engaging blades supported by said shaft and braced to said frame to act on the soil and cooperate with the cutters in severing growth, a mold board secured to one of the blades and extending rearwardly and across the rear of the other blades, each of said cutters including radially extending blades to act on the soil between the first-named blades and to cut growth above the soil.

JOHN L. JONES.